United States Patent [19]

Danko

[11] 3,944,176
[45] Mar. 16, 1976

[54] UNIVERSAL MOUNTING BACKBOARD
[75] Inventor: Arthur Joseph Danko, Oak Lawn, Ill.
[73] Assignee: Illinois Tool Works Inc., Chicago, Ill.
[22] Filed: June 24, 1974
[21] Appl. No.: 482,260

[52] U.S. Cl. ............ 248/68 R; 248/73; 248/DIG. 3; 339/125 R; 174/72 A
[51] Int. Cl.² ...................... F16L 3/22; H02B 1/02
[58] Field of Search .......... 248/49, 65, 67.7, 68, 71, 248/73, 216, 220.5, 223, 361, DIG. 3; 174/72 A, 138 D; 317/122; 339/119 R, 119 C, 125, 126, 128, 198 G, 198 GA; 179/98; 85/41

[56] References Cited
UNITED STATES PATENTS

| 1,719,136 | 7/1929 | Rosenberg | 85/41 |
|---|---|---|---|
| 2,614,701 | 10/1952 | Mapson | 248/223 |
| 2,660,130 | 11/1953 | Johnson | 248/361 |
| 3,022,973 | 2/1962 | Morrow et al. | 248/DIG. 3 |
| 3,154,281 | 10/1964 | Frank | 248/DIG. 3 |
| 3,443,783 | 5/1969 | Fisher | 248/220.5 |
| 3,573,373 | 4/1971 | Mullin et al. | 317/122 |
| 3,809,799 | 5/1974 | Taylor | 248/223 |

FOREIGN PATENTS OR APPLICATIONS

| 554,796 | 6/1932 | Germany | 248/DIG. 3 |
|---|---|---|---|
| 52,701 | 8/1965 | Germany | 174/72 A |
| 1,515,634 | 8/1969 | Germany | 317/122 |

*Primary Examiner*—Roy D. Frazier
*Assistant Examiner*—Lawrence J. Staab
*Attorney, Agent, or Firm*—Olson, Trexler, Wolters, Bushnell & Fosse, Ltd.

[57] ABSTRACT

Apparatus for quickly and economically creating a telephone cable interconnecting point is disclosed. The apparatus includes a backboard having a planar pan formed with a plurality of holes oriented in a predetermined pattern. Terminal block supporting brackets having an open throat and wire guide posts or distributing rings are fastened to the backboard with integral fasteners which permit the cable to be layed in place and captured when the terminal block is mounted on the brackets. The brackets and posts are capable of being spaced in oriented patterns to accept the cables, brackets and associated terminal blocks.

12 Claims, 7 Drawing Figures

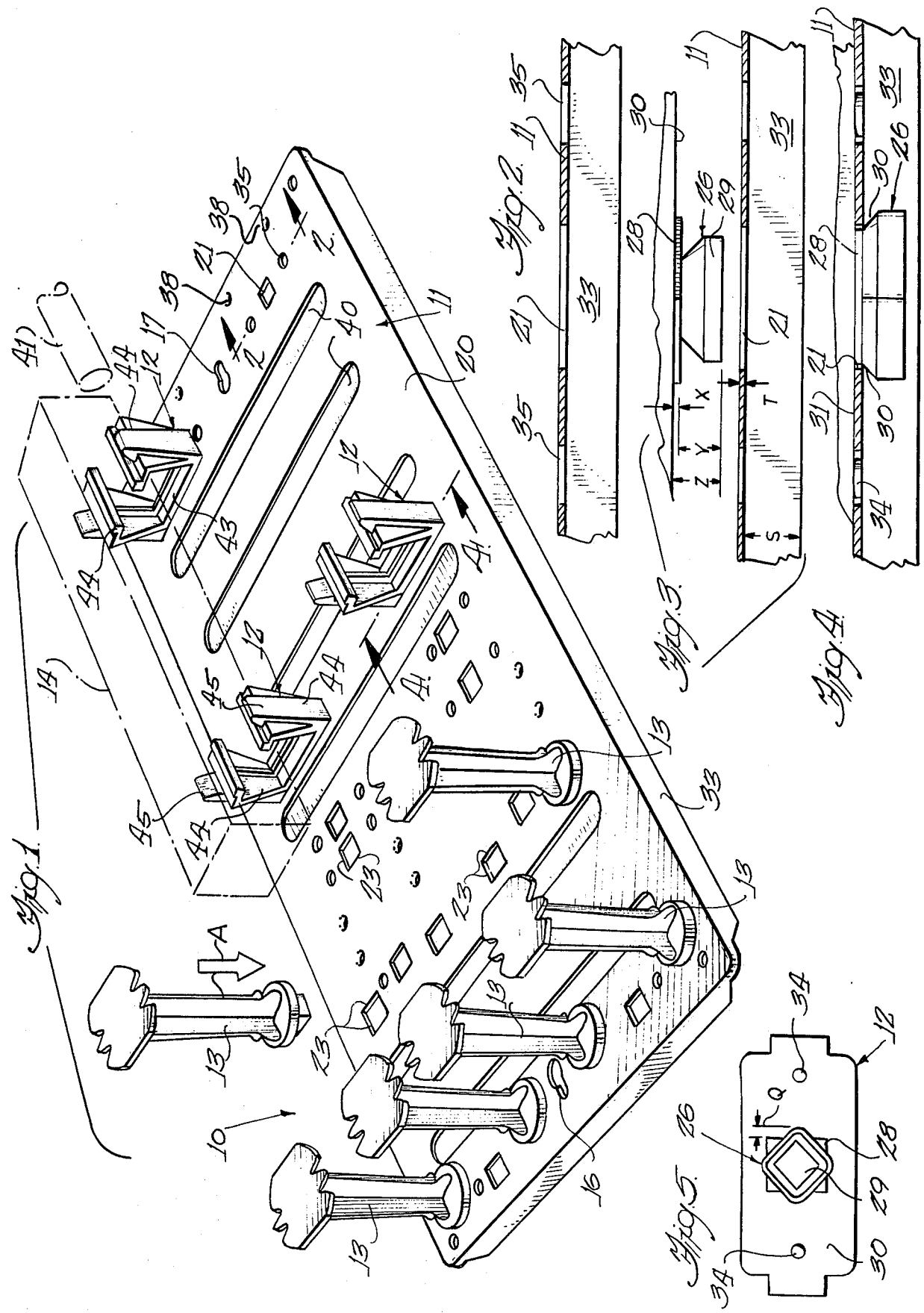

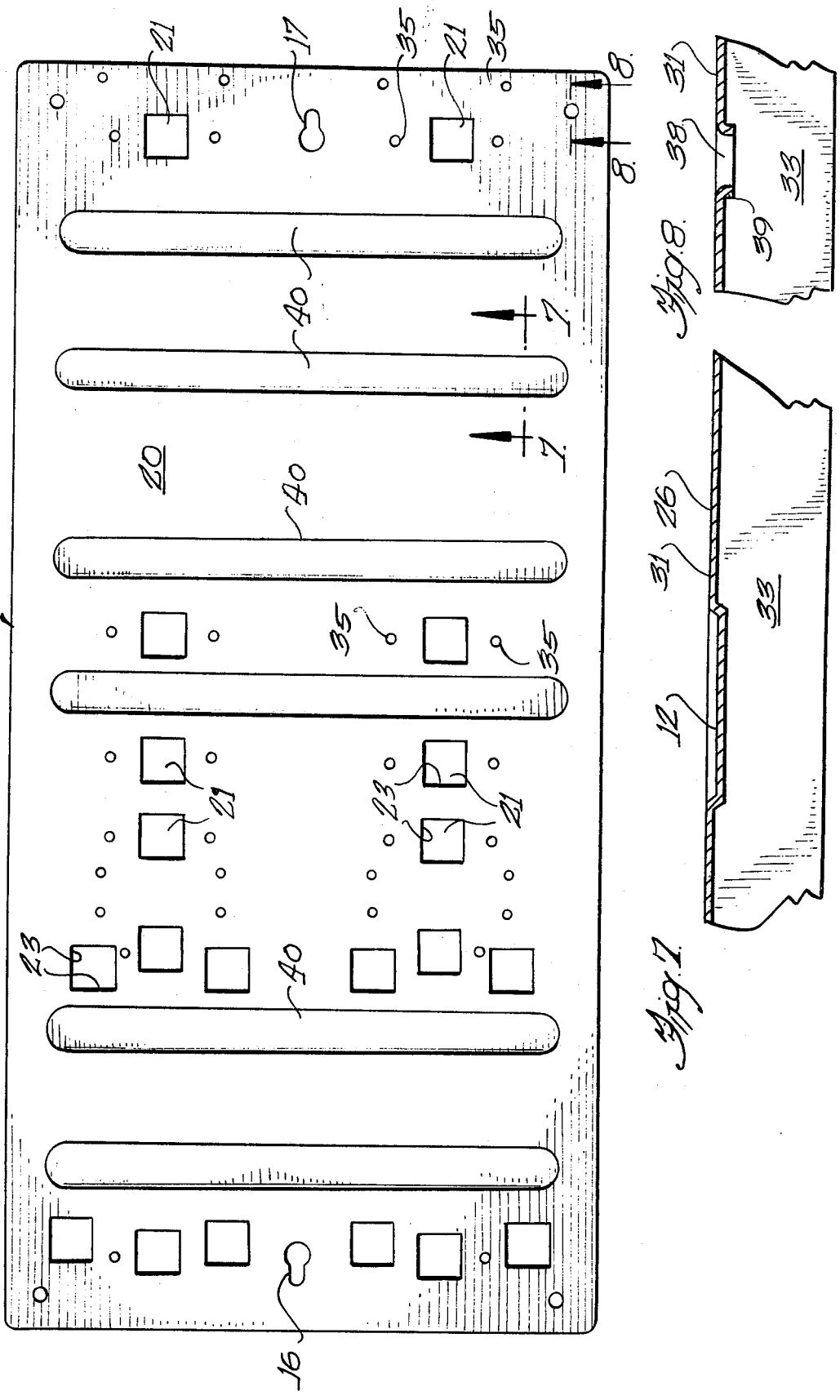

UNIVERSAL MOUNTING BACKBOARD

BACKGROUND OF THE INVENTION

This invention relates generally to apparatus for mounting and interconnecting telephone cables and the like at a terminal connection point.

In modern commercial or industrial key telephone systems and like electrical wiring installations, individual terminal interconnecting points are necessary. At these interconnecting points, a number of wires leading in cable form from a telephone central office can be individually connected to wires coming from a number of individual telephone sets or other equipment. Since several hundred or more wires may be routed to the interconnecting point, apparatus must be provided there which permits electrical wire interconnection in a straightforward and inexpensive manner.

At present, a number of apparatus systems are offered to provide these interconnections. Some such systems are formed of wooden parts and are more or less hand-crafted for use at each individual interconnecting point. Such apparatus is relatively expensive and may necessitate interconnection of wires in a somewhat haphazard or illogical manner.

Other systems provide a backboard member, which may be formed of wood, plastic or other material and which is adapted to be mounted to a building wall or other platform. An elongated bridge-like mount member is then secured to the backboard, and upon the mount is attached a terminal connecting block. The necessary cables are then threaded through the mount ends. Individual wires comprising each cable are thereafter threaded through slots in the mount sides and up to the connecting block itself. As a practical matter, the backboards, mounts and cable-guiding devices, called distributing posts, are supplied as one or more preassembled units to the telephone cable installer.

It is the general object of the present invention to provide improved terminal connecting point connection apparatus of more versatile design and less expensive cost.

More specifically, it is an object of the invention to provide apparatus for terminal connecting points which requires only a minimum inventory of parts to provide a maximum of completed interconnecting point configurations.

It is another object to provide a terminal block connecting point backboard and associated parts which can accommodate a variety of connecting blocks of various dimensional lengths and wire-accepting capacities.

Yet another object is to provide terminal interconnecting point apparatus which utilizes individualized brackets and eliminates the above-described mount member. A related object is to provide such brackets which are adapted for connection to the connecting block and the backboard at spaced apart points, thereby maximizing the amount of wire routing room underneath the connecting block and above the backboard. Another related object is to simplify the routing of cables and individual wires coming to the terminal point, and to make easier the connection of the wire ends to the connecting block itself. An ancillary object is to provide apparatus which permits the terminal connecting block to be easily lifted from the brackets, thereby making it easy to correct or change wire terminal connections.

Still another object of the invention is to provide a number of distributing rings or wiring guide posts which are especially adapted for use with the backboard.

A further object of the invention is to provide terminal connecting point apparatus which will permit the cable installer to lay cable over the backboard and then fan out the cable-constituent individual wires before the connecting block is secured in plce upon the backboard. In this manner, cable and wires can be preliminarily positioned with a maximum of ease and a minimum of time and effort.

A still further object is to provide a terminal connecting point apparatus which permits installation of the above-described brackets and/or distributing posts by the telephone installer himself as he works at the on-site terminal interconnecting point.

Yet another object is to provide terminal interconnecting point apparatus which permits installation of the brackets and/or distributing posts upon the backboard by addressing the backboard from one side only. A related object is to provide brackets and distributing posts for use with a backboard which eliminate the need for access to the reverse side of the backboard when installing the posts or brackets. Another related object is to provide posts and brackets which are sturdy in design, and which resist inadvertent breakage or disassembly from their installed points upon the backboard.

Other objects and advantages of the invention will become apparent upon reading the following detailed description and upon reference to the drawings. Throughout the description, like reference numerals refer to like parts.

BRIEF DESCRIPTION OF THE DRAWINGS

FIG. 1 is a general perspective view of the novel apparatus of the present invention, including a backboard, a plurality of distributing posts, and a plurality of connecting block mounting brackets;

FIG. 2 is a fragmentary sectional view taken substantially in the plane of line 2—2 in FIG. 1 and showing in further detail the construction of the backboard;

FIG. 3 is a fragmentary sectional view taken substantially in the plane of line 2—2 in FIG. 1 similar to FIG. 2 but showing the appearance of the apparatus as a mounting bracket is being addressed for attachment to the backboard;

FIG. 4 is a fragmentary sectional view taken substantially in the plane of line 4—4 in FIG. 1 similar to FIGS. 2 and 3 but showing the apparatus as it appears when a mounting bracket has been attached to the backboard;

FIG. 5 is a plan view showing the bottom of a mounting bracket;

FIG. 6 is a plan view showing in further detail the novel backboard of the present invention;

FIG. 7 is a sectional view taken substantially in the plane of line 7—7 in FIG. 6 and showing in yet further detail the construction of the novel backboard; and FIG. 8 is a sectional view taken substantially in the plane of line 8—8 in FIG. 6 and showing in further detail several backboard holes specially adapted to accommodate sheet metal screws which may be used to mount additional parts to the apparatus.

DETAILED DESCRIPTION

While the invention will be described in connection with a preferred embodiment and procedure, it will be understood that it is not intended to limit the invention to this embodiment or procedure. On the contrary, it is intended to cover all alternatives, modifications and equivalents as may be included within the spirit and scope of the invention.

Turning first to FIG. 1, there is shown the novel apparatus 10 of the present invention. In general, this apparatus can be considered to include a mounting backboard 11 upon which are secured a number of mounting brackets 12 and distributing or wire guide posts 13 made of polyvinyl chloride plastic or other suitable material. As is explained in further detail below, the brackets 12 accommodate a terminal connecting block 14 (shown in phantom lines) at a stand-off position spaced above the top surface of the backboard 11.

It is a feature of the invention that the backboard 11 can be easily mounted to a wall or other stationary platform (not shown). To this end, key holes 16 and 17 are centrally located at each end of the backboard 11, and are sized to accommodate a backboard-wall fastening screw. Maximization of spacing between these mounting holes 16 and 17 discourages foundation crumbling or wall breakout which could be caused by locating these holes closer together.

If desired, a number of different sizes of backboards can be fabricated to accommodate different numbers of terminal wires and sizes of terminal blocks. To ease backborad selection and identification, the differenct sizes of backboards can be painted or otherwise finished in different colors. Color coding could also be used to designate various originating sources of the wires accommodated on the backboard.

In accordance with one aspect of the invention, the backboard 11 is provided with a pan member 20 of substantially uniform cross-sectional thickness, in which a plurality of polygonal (here, square) holes 21 are provided, and which are defined by straight pan edges 23. This pan 20 and other portions of the backboard 11 can be formed of an appropriate-gauge metal or other convenient material. Fasteners 26, such as those shown in FIGS. 3–5, are provided upon the bottoms of the brackets 12 and distributing rings or posts 13, and these fasteners 26 are specially adapted to attach the respective brackets and posts to the backboard 11. Moreover, secure bracket-backboard or post-backboard connections are obtained although the backboard 11 may be addressed from only one side and access to the reverse side of the backboard may be prohibited because the backboard is fixed to the underlying wall, or for other reasons. In general, these fasteners 26 include a base 28 which is of a given thickness X, as shown in FIG. 3, and which has a polygonal cross-sectional shape substantially co-extensive with the hole 21 into which the base 28 fits, as shown in FIG. 5. A head 29 projects from the base 28 and is of polygonal cross-sectional shape at least congruent, if not co-extensive, with the hole 21, i.e., the head cross-section is the same shape as the hole 21, but may be smaller in size than the hole. However, this head 29 is offset with respect to the base; here, as shown in FIG. 5, this offset takes the form of an angular offset of substantially 45°. As further shown in FIG. 3, the head 29 projects from the base 28 for a predetermined distance Y; together, the base 28 and head 29 project from a fastener foundation plane 30 a total predetermined distance Z.

When it is desired to mount a part such as the distributing post 13 on the backboard 11, the part is oriented and moved toward the addressed backboard in the direction indicated by the arrow A in FIG. 1. Such addressing motion moves the fastener device from the relative position illustrated in FIG. 3 into the backboard with the head being pushed into and through the hole 21. When the part is so preliminarily mounted, the installer then turns the part through one-eighth of a revolution. This rotative motion aligns the base 28 with the hole 21 and causes the base 28 to snap into and substantially fill the pan hole 21, as illustrated in FIG. 4. Thus located, head cam surfaces 30 resiliently engage backboard pan material 31 adjacent to and defining the edges of the hole 21, and secure the fastened part in place.

To provide a rigid, secure fastener-backboard interlock, the pan material 31 which defines the holes 21 is of a uniform thickness T equal to or greater than the thickness X of the fastener base 28. Moreover, the pan material thickness T extends uniformly away from each hole 21 for a distance at least equal to the amount of offset extension Q of the fastener head, thus permitting the head to rotatably snap into interlocking place. Generally similar fastener arrangements are disclosed in U.S. Pat. Nos. 3,443,783 to Fisher and 2,940,558 to Schlueter and in co-pending U.S. application Ser. No. 333,574 by Fisher, filed Feb. 20, 1973.

In further accordance with the invention, the backboard 11 includes a skirt 33 which extends perpendicularly to the plane of the pan 20 over a distance S, as shown in FIGS. 3 and 4. This skirt depth S is greater than the distance Y over which any fastener head 29 extends from its base 28. Thus, when the brackets 12 or the distributing posts 13 are secured to the backboard 11, the fastening heads 29 are located with a clearance between the pan 20 and the skirt-abutted wall (not shown) when the fastener base 28 is located in the pan hole 21.

It will be understood that while it may be convenient to locate the skirt 33 at the periphery of the pan member 20, it is only necessary, in the illustrated embodiment, that the skirt be located at a position on the pan 20 which is spaced apart from all the pan holes 21 by an amount greater than the amount of offset extension Q, as shown in FIG. 5, of any fastener head 29 from the corresponding fastener base 28. This spacing prohibits skirt-head interference as the fastener-supported part is rotated into backboard-fastener interlocking position.

In carrying out the invention, it is important that the brackets 12 be linearly aligned and be discouraged from inadvertent rotational misalignment. To this end, one or more secondary securing studs 34 project from the foundation plane in a direction generally parallel to the primary fastener head 29 and base 28, but the studs 34 are spaced apart from the primary fastener 26, as shown in FIG. 5. Mating holes 35 are provided in the backboard pan 20 to receive the studs 34 and orient the bracket 12 and fastener 26 in the illustrated predetermined angular array upon the backboard 11.

It is yet another feature of the invention that mounts, connecting blocks 14 and other parts which are not provided with the described fasteners 26 can be mounted directly to the backboard 11. To this end, sheet metal-accepting screw holes 38 are provided. As illustrated particularly in FIG. 8, these screw-receiving holes 38 are at least partially defined by extended flanges 39. The flanges 39 are formed of a thin membrane of the material forming the pan 20 or other yieldable material; when a screw (not shown) is turned into the hole 38, the thread of the male screw forms a mating thread on and in the female flange 39 to secure the screw in a retaining position on the backboard 11.

As shown in FIGS. 6 and 7, a plurality of transversely extending rib members 40 are embossed upon the pan 20 to stiffen the pan and the backboard 11 itself.

Still another feature of the invention is that the rectilinear connector block 14 is mounted at its illustrated stand-off position above the backboard 11 by connection to brackets 12 at each block end. When mounted as illustrated in FIG. 1, substantially the entire underside of the connector block 14 is thus unobstructed, and is positioned above the backboard 11 at a selected stand-off distance to permit a number of cables 41 to pass freely below the connector block 14 and above the backboard 11. Individual wires constituting the cable 41 can easily be fanned and drawn up around the sides of the connector block 14 for attachment to individual connector block terminals. It will be understood that by providing a plurality of properly aligned holes 21 in the backboard 11, the brackets 12 can be mounted at a variety of positions, and a corresponding variety of differently dimensioned connector blocks 14 can be accommodated. Thus, in accordance with a further aspect of the invention, only a relatively few apparatus parts need be manufactured and inventoried to meet a wide variety of terminal interconnecting point requirements.

In accordance with another aspect of the invention, use of the terminal point apparatus 10 is easy. Depending upon the desires of the cable installer, the backboard 11 can be first installed upon a wall. Thereafter, even though the underside of the backboard is not accessible, the distributing cable guide posts 13 can be addressed to the backboard 11 and installed in the holes 21 by inserting the fasteners 26 into the holes and twisting the posts 13 through a one-eighth turn. If desired, cables can be preliminarily layed between the posts at this time. A plurality of brackets 12 are also secured to the backboard at the illustrated spaced apart but aligned positions. This is done by inserting the bracket fasteners 29 into the respective holes 21 and twisting the brackets 12 through one-eighth turn, in a manner similar to that used for the distributing posts 13, to align the secondary studs 34 with the mating holes 35. If necessary, cables or individual wires can be preliminarily laid over base portions 43 of the U-shaped brackets 12 in positions between upstanding bracket pillars 44. These wires or cables are then fanned out into preliminary connection positions as desired. Next, the terminal connector block 14 is snapped or otherwise secured to free ends 45 of the bracket pillars 44 to position the connector block as illustrated in FIG. 1. Finally, the terminal ends of the wires or cables can be attached to the connector block in any convenient manner to create an operable terminal interconnecting point.

The invention is claimed as follows:

1. A modularized device for mounting the terminals of telephone cables and the like, comprising an apertured backboard panel adapted to be mounted to a complementary support, a plurality of bracket means and one or more elongated terminal blocks, said backboard including a substantially planar portion and means for spacing the planar portion from the complementary support, the plurality of apertures in said support provided in a predetermined pattern of orientation; a plurality of said bracket means mounted in spaced relation on said backboard, said bracket means including a base for mounting each of said bracket means in juxtaposition relative to said planar portion, fastener means associated with the base of each of said bracket means and cooperative with one or more of the margins of said apertures to orient said bracket means relative to said planar portion in predetermined orientation patterns relative to each other, said bracket means further including one or more support pillars providing laterally spaced positive shoulder support means spaced from said base a substantial distance with said shoulder means lying in a plane substantially parallel to said panel and forming an open throat configuration adapted to permit said associated cables to be laid into and within said open throat of each of the said bracket means said throat extending longitudinally of the terminal block to be supported by said bracket means, each bracket means further including additional independently resilient means for receiving and retaining a portion of an associated terminal block positioned on said positive shoulder support means in spaced relation to said planar portion of the backboard and to capture the one or more cables laid into the bracket means between said base of said bracket means and the terminal block, each said terminal block being supported by at least two spaced bracket means mounted in spaced predetermined positioned apertures in said backboard suitably accepting and orienting one or more of a corresponding variety of differently dimensioned terminal blocks, the spacing between each said terminal blocks and the base of its cooperating bracket means base being adequate to permit each of the associated cables to be fed laterally with the individual wires in said cables being connectable to an individual terminal in said block, each bracket fastener means being insertable from the face of said planar portion opposite from said complementary support.

2. A modularized device in accordance with claim 1 wherein said backboard includes a pan having a planar surface and a depending skirt, said planar portion having a plurality of apertures spaced in a predetermined pattern of orientation and capable of cooperation with the fastener means to orient the brackets.

3. A modularized device of the type claimed in claim 2 wherein said apertures are noncircular in configuration, said bracket means and its associated fastener means being receivable in said apertures and orienting said bracket means relative to said pan.

4. A modularized device of the type claimed in claim 3 wherein said plurality of apertures are defined by a given number of straight edges adapted to accept said fastener means which includes a base of a given thickness and polygonal cross-sectional shape substantially co-extensive with the aperture and having an axial extent substantially equal to the thickness of the pan material, and a fastener head projecting from the fastener base and of a polygonal cross-sectional shape at least congruent with said aperture but angularly offset with respect to the fastener base, the head extending from the fastener base over a predetermined distance, the backboard futher including a skirt depending from the pan and extending in a direction generally perpendicular to the plane of the pan over a distance greater than the predetermined distance over which the fastener head extends from the fastener base to permit the fastener head to be located between the planar portion of the pan and the support when the fastener base is located in the pan aperture.

5. A modularized device of the type claimed in claim 3 wherein said plurality of apertures are defined by a give number of straight edges and said fastener means including a base of a given thickness and polygonal cross-sectional shape substantially co-extensive with a pan aperture, and a head projecting from the fastener base and of a polygonal cross-sectional shape at least congruent with the said aperture but angularly offset with the base.

6. A modularized device of the type claimed in claim 5 wherein said pan apertures are provided at distances to mount the connector block to the aperture engaging bracket means adjacent each end of the connector block thereby leaving substantially the entire underside of the block unobstructed and positioned above said pan to permit a plurality of cables to be accepted in the open throat of said bracket means to pass freely below the connector block within the confines of the space defined by said bracket means and said connector block.

7. A modularized device as claimed in claim 1 including a plurality of distributing posts, fastening means associated with one end of said posts to attach said posts to the backboard apertures at predetermined locations to permit said posts to guide and retain cables in desired patterns and locations on said backboard.

8. A modularized device of the type claimed in claim 7 wherein said planar backboard panel includes a plurality of polygonal apertures each defined by a given number of straight edges, the post fastening means including a base of a given thickness and polygonal cross-sectional shape substantially co-extensive with a pan aperture, and a head projecting from the base and of a polygonal cross-sectional shape at least congruent with said aperture but angularly offset with respect to the fastener base.

9. A modularized device in accordance with claim 3 wherein said pan is provided with a plurality of rectangular apertures.

10. A modularized device as claimed in claim 9 wherein said pan is provided with a plurality of square apertures.

11. A modularized device of the type claimed in claim 4 wherein said skirt is located at the periphery of said pan.

12. A modularized device of the type in accordance with claim 11 wherein said pan includes a plurality of rib members embossed upon said pan and extending transversely thereof to stiffen said pan.

* * * * *